Patented May 27, 1924.

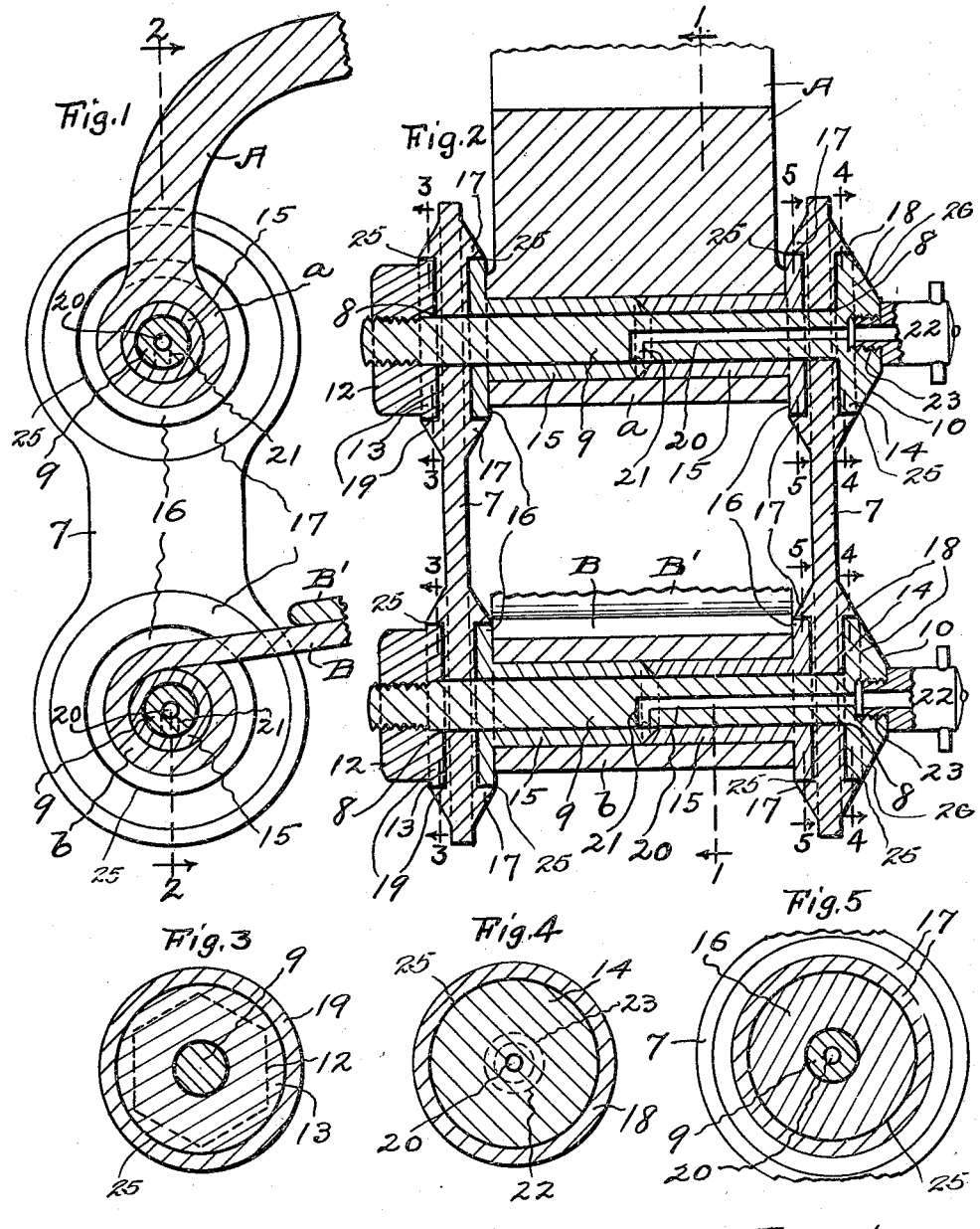

1,495,188

UNITED STATES PATENT OFFICE.

BENNO B. LEUSTIG, OF CLEVELAND, OHIO.

SHACKLE.

Application filed March 31, 1922. Serial No. 548,360.

*To all whom it may concern:*

Be it known that I, BENNO B. LEUSTIG, a citizen of the United States, residing at Cleveland, in the county of Cuyahoga and State of Ohio, have invented a new and useful Shackle, of which the following is a specification.

This invention relates to improvements in shackles, and more especially pertains, not only to a shackle employed in connecting a member of a vehicle-frame to a tubular member or eye participating in the formation of a free end portion of the master-leaf of a laminated spring employed in supporting and cushioning said frame, but to a shackle which comprises two spaced plates adapted to extend the one opposite one face and the other opposite the other face of the aforesaid eye and penetrated by a pivotal pin which is employed in connecting said plates together and arranged to extend centrally and endwise of and through said eye and surrounded by two sleeve-members which are rotatably mounted on said pin and arranged end to end between and rotatable independently of said plates.

In my improved shackle, as hereinafter described, the hereinbefore mentioned pivotal pin engages and extends through two alined pin-receiving holes formed in opposite plates respectively of the shackle and through two spaced circular recesses formed in each plate at opposite ends respectively of and concentrically in relation to the hole formed in said plate and engaged by said pin, and the sleeve-members surrounding said pin and alined endwise between the shackle-plates have external annular flanges engaging the inner recesses formed around said pin at the inner sides of and in said plates, and one object of my invention is to prevent leakage of lubricant at the ends of said pin by the occupation of the outer recess formed around said pin at the outer side of and in one of said plates by a head formed on said pin, and by the occupation of the outer recess formed around said pin at the outer side of and in the other of said plates by a nut threaded onto said pin.

Another object is to adequately lubricate my improved shackle, and to exclude dust and other objectionable matter from the bearing surfaces of the shackle, without unduly weakening the hereinbefore mentioned shackle-plates.

Another object is not only to form two recesses at opposite ends of the hereinbefore mentioned pin-receiving holes in the shackle-plates of my improved shackle but to have said recesses corresponding in dimensions so as to render said plates interchangeable and reversible side for side.

Another object is to prevent objectionable leakage of lubricant from the bearing surfaces of my improved shackle without the use of washers or packing.

Another object is to provide the head of each pivotal pin with an outer circumferential annular beveled surface which is flush with an annular beveled surface on the adjacent shackle-plate so as to improve the appearance of the shackle and facilitate the maintenance of the shackle in a clean condition.

Another object is to form the surrounding walls of the hereinbefore mentioned recesses by annular flanges which are formed on the shackle-plates and correspondingly beveled externally and measure the same in internal diameter, so that the flanged and recessed shackle-plates of the hereinafter described shackle are interchangeable, reversible side for side, and reversible end for end.

Another object is to facilitate the assemblage of the component parts of my improved shackle, and to render the shackle simple and durable in construction and highly practical.

With these objects in view, and to attain any other object hereinafter appearing, this invention consists in certain features of construction, and combinations and relative arrangements of parts, hereinafter described in this specification, pointed out in the claims, and illustrated in the accompanying drawings.

In said drawings, Figures 1 and 2 are sectional views of a shackle embodying my invention, Fig. 2 being taken along the line 2—2 in Fig. 1, and Fig. 1 being taken along the line 1—1 in Fig. 2, and in said figures the shackle is shown as forming a connection between a terminal eye of a leaf-spring and a member of a vehicle-frame or other object in the support and cushioning of which said spring is to participate. Fig. 3 is a vertical section taken along either line 3—3 in Fig. 2, looking outwardly. Fig. 4 is a vertical section taken along either line 4—4 in Fig. 2, looking outwardly. Fig.

5 is a vertical section taken along either line 5—5 in Fig. 2, looking outwardly.

Referring to Figs. 1 and 2 of said drawings, A indicates a downwardly projecting arm of the frame of a vehicle or other object, and said arm is shown terminating at its lower end in a substantially horizontal tubular member or eye *a* arranged vertically over and a suitable distance from the substantially horizontal tubular member or eye *b* which is parallel with the member *a* and formed on a vertically movable or free end portion of the master-leaf B of a leaf-spring, and B' indicates the next adjacent and shorter leaf of said spring.

The tubular member or eye *b* of the leaf-spring and the tubular member or eye *a* of the arm A are shown connected together, in the Figs. 1 and 2, by a shackle embodying my invention, and said shackle comprises two laterally spaced and parallel oblong metal plates 7 which are opposite each other and shown arranged substantially vertically. One of said plates has its lower end portion opposite one end face of the tubular member or eye *b* of the leaf-spring, and the other of said plates has its lower end portion opposite the other end face of said member *b* of the spring, and each plate 7 has its upper end portion opposite the adjacent end face of the tubular member or eye *a* of the arm A.

Each end portion of each plate 7 has a hole 8 which (see Fig. 2) extends laterally through the plate and is in line endwise with the corresponding hole in the other plate, and a pivotal pin 9 extends through said holes and outwardly from the outer ends of said holes.

Each pin 9 (see Fig. 2) is diametrically enlarged at the outer side of one of the plates 7 to form a head 10, and a nut 12 (see Figs. 2 and 3) is threaded onto said pin and arranged at the outer side of and in close proximity to the other of said plates and has its inner end portion 13 circular in cross-section. The inner end portion 14 of the head 10 of each pin 9 is circular externally in cross-section, as shown in Fig. 4, and overlaps the outer side of the adjacent plate, as shown in Fig. 2.

Each pin 9 is loosely embraced and surrounded by two sleeve-members 15 which are arranged and alined endwise between the plates 7. As shown in Figs. 1, 2 and 5, each sleeve-member 15 is provided, at its outer end and externally, with an annular flange 16 which is externally circular in cross-section and concentric in relation to the adjacent pin 9 and arranged at and in close proximity but loose in relation to the adjacent plate 7.

Each flange 16 of each sleeve-member 15 (see Figs. 1, 2 and 5) has its outer circumferential surface covered by an annular flange 17 which is formed on the adjacent plate 7 at the inner side of the plate and surrounds and closely embraces but is loose in relation to said flange 16 of said sleeve-member. The flange 17 of each plate 7 is therefore circular internally in cross-section and concentric in relation to the adjacent pin 9.

The externally circular inner end portion 14 of the head 10 of each pin 9 (see Figs. 2 and 4) has its outer circumferential surface covered by an annular flange 18 which is formed on the adjacent plate 7 at the outer side of the plate and surrounds said portion of said head, and said outer flange 18 of said plate preferably has its internal diameter measuring the same as the internal diameter of the adjacent inner flange 17 of said plate, and said portion of said head is large enough in diameter to be and is closely embraced by said outer flange 18.

The externally circular inner end portion 13 of each nut 12 (see Figs. 2 and 3) has its outer circumferential surface covered by an annular flange 19 which is formed on the adjacent plate 7 at the outer side of the plate and surrounds said portion of said nut, and said outer flange 19 of said plate preferably has its internal diameter measuring the same as the internal diameter of the adjacent inner flange 17 of said plate, and said portion of said nut is large enough in diameter to be and is closely embraced by said outer flange 19.

The flanges 16 of the sleeve-members 15 and the externally circular inner end portions of the heads 10 and nuts 12 on the pins 9 are shown as measuring the same in external diameter, and all of the flanges 17, 18 and 19 measure the same in internal diameter, so that the plates 7 are interchangeable and reversible end for end and side for side as required to effect the reduction, to a minimum, of the cost of manufacture and assemblage of the component parts of my improved shackle, and the covering of the outer circumferential surfaces of the flanges 16 of the sleeve-members 15 and the outer circumferential surfaces of the externally circular inner end portions of the heads 10 and nuts 12 by flanges on said plates materially serves to exclude dust or other objectionable matter from the bearing surfaces of the shackle without unduly weakening said plates.

Fig. 2 shows the sleeve-members 15 on the lower pin 9 as tightly embraced by the eye *b* of the leaf-spring, and also shows the sleeve-members 15 on the upper pin 9 as tightly embraced by the eye *a* of the arm A, and it will be observed that each flange 16 of each sleeve-member 15 measures more in external diameter than and fully and closely covers and thereby protects the adjacent face of the adjacent eye.

Within each pin 9 (see Fig. 2) is formed a lubricant-conducting passage 20 which extends from within the head 10 of said pin inwardly and longitudinally of the pin to a point approximately centrally between the plates 7 and thence extends, as at 21, to the outer circumferential surface of the pin, and obviously lubricant discharged from the inner end of said passage creeps longitudinally and exteriorly of said pin to and between each plate 7 and the adjacent flange 16 and also to the head 10 of the pin and to the nut 12 on said pin, so that the bearing surfaces of the shackle are adequately lubricated.

The head 10 of each pin 9 is provided, in any approved manner, with a lubricant-supplying cup 22 shown threaded, at its inner or lubricant-discharging end portion 23, into said head, and said end portion of said cup is in communication with the lubricant-conducting passage 20.

In the illustrated shackle embodying my invention it will be observed that each hereinbefore mentioned flange of each plate 7 forms the surrounding wall of a circular recess 25 in said plate, that two spaced diametrically corresponding recesses 25 are therefore formed at opposite ends respectively of each hole 8 in each plate 7 and are concentric in relation to and considerably larger in diameter than said hole and have corresponding dimensions so as to render said plates interchangeable and reversible side for side, that the pin 9 engaging said hole is surrounded by said recesses, that the inner of adjacent recesses 25 in each end portion of each plate 7 is engaged by the flange 16 of the adjacent sleeve-member 15, that the outer of adjacent recesses 25 in each end portion of one of the plates 7 is shown occupied by the inner end portion 14 of the head 10 of the adjacent pivotal pin and that the outer of adjacent recesses 25 in each end portion of the other of said plates is shown occupied by the inner end portion 13 of the nut 12 on the adjacent pivotal pin, and that obviously, therefore, objectionable leakage of lubricant at the ends of the pivotal pins of my improved shackle is successfully prevented.

The recesses 25 measure preferably materially more in diameter than the holes 8, and it will be observed that the flanges forming the surrounding walls of said recesses are correspondingly beveled externally as shown in Fig. 2, that the head 10 of each pin 9 has an outwardly facing circumferential annular beveled surface 26 which is concentric in relation to the axis of the pin, that said beveled surface of said head is formed externally of the head between the externally circular inner end portion and the outer extremity of the head, and that the beveled outer circumferential surface of the flange 18 surrounding said head is flush with the beveled surface 26 of said head, so as to improve the appearance of the shackle and facilitate the maintenance of the shackle in a clean condition.

What I claim is—

1. A shackle comprising two laterally spaced plates each of which has a pin-receiving hole alined endwise with a pin-receiving hole in the other plate, a pivotal pin extending between said plates and through said holes and having a head associated with one of said plates, said pin being held in place in relation to the other of said plates, and two sleeve-members surrounding said pin and arranged and alined endwise between said plates and each provided at its outer end with an external annular flange, the plate associated with the aforesaid head having two spaced circular recesses formed at opposite ends respectively of and diametrically larger than and concentric in relation to the pin-receiving hole formed in said plate and engaged by said pin, the inner of said recesses being engaged by the aforesaid flange on the adjacent sleeve-member, the aforesaid head being embraced and surrounded by the surrounding wall of and engaging the outer of said recesses, and said recesses corresponding in diameter.

2. A shackle comprising two laterally spaced plates each of which has a pin-receiving hole alined endwise with a pin-receiving hole in the other plate, a pivotal pin extending between said plates and through said holes, a nut threaded onto said pin and arranged at the outer end of and diametrically larger than the aforesaid hole in one of said plates, said pin having a head which is arranged at the outer end of the aforesaid hole in the other of said plates and adapted to cooperate with said nut in holding said pin in place, and two sleeve-members surrounding said pin and arranged and alined endwise between said plates and each provided at its outer end with an external annular flange, the plate arranged adjacent the aforesaid nut having two spaced diametrically corresponding circular recesses formed at opposite ends respectively of and diametrically larger than and concentric in relation to the pin-receiving hole formed in said plate and engaged by said pin, the inner of said recesses being engaged by the aforesaid flange on the adjacent sleeve-member, and the aforesaid nut being embraced and surrounded by the surrounding wall of and engaging the outer of said recesses.

3. A shackle comprising two opposite spaced plates each of which has a pin-receiving hole alined endwise with a pin-receiving hole in the other plate, a pivotal pin extending between and through said holes and having a head at the outer end of one of said holes, a nut threaded onto said pin and arranged at the outer end of the other of said holes, and two sleeve-members surrounding said pin and arranged and alined endwise between the plates and each provided at its outer end with an external annular flange, each plate having two spaced diametrically corresponding circular recesses which are formed at opposite ends respectively of and diametrically larger than and concentric in relation to the pin-receiving hole formed in said plate and engaged by said pin, the inner of the recesses formed around said pin at each of said pin-receiving holes being engaged by the aforesaid flange on the adjacent sleeve-member, the aforesaid nut being embraced and surrounded by the surrounding wall of the outer recess formed around said pin in one of the plates, and the aforesaid head being embraced and surrounded by the surrounding wall of the outer recess formed around said pin in the other of said plates.

4. A shackle comprising two spaced opposite plates each of which has a pin-receiving hole and two spaced circular recesses formed at opposite ends respectively of and concentrically in relation to said hole and has said hole alined endwise with the corresponding hole in the other plate, a pivotal pin extending through said holes and surrounded by said recesses and having a head embraced and surrounded by the surrounding wall of the outer recess formed around said pin in one of said plates, a nut threaded onto said pin and embraced and surrounded by the surrounding wall of the outer recess formed around said pin in the other of said plates, and two sleeve-members surrounding said pin and arranged and alined endwise between said plates and each provided at its outer end with an external annular flange engaging the inner recess formed around said pin in said plates, said inner recess and the aforesaid outer recess having corresponding dimensions.

5. A shackle comprising two spaced opposite plates each of which has a pin-receiving hole and two spaced circular recesses formed at opposite ends respectively of and diametrically larger than said hole and has said hole alined endwise with the corresponding hole in the other plate, a pivotal pin extending through said holes and surrounded by said recess and having a head which has an externally circular inner end portion engaging the outer recess formed around said pin in one of said plates, a nut threaded onto said pin adjacent the other of said plates and having an externally circular inner end portion engaging the outer recess formed around said pin in the other of said plates, and two sleeve-members surrounding said pin and arranged and alined endwise between said plates and having external annular flanges engaging the inner recesses formed around said pin in said plates, the aforesaid inner end portion of the aforesaid nut being embraced and surrounded by the surrounding wall of the recess engaged by said nut, the aforesaid inner end portion of the aforesaid head being embraced and surrounded by the surrounding wall of the recess engaged by said head, and all of said recesses being concentric in relation to the aforesaid pin and measuring the same in diameter.

6. A shackle comprising two spaced opposite plates, a pivotal pin extending through said plates and having a head at the outer side of one of said plates, said pin at the other being held in place in relation to the other of said plates, and two sleeve-members surrounding said pin and arranged and alined endwise between the plates, the aforesaid head having its inner end portion closely surrounded by a portion of the adjacent plate and also having an external outwardly facing beveled circumferential surface between said portion of said head and the outer extremity of the head, and the last-mentioned plate being provided, at its outer side, with a beveled circumferential surface which is flush with the aforesaid beveled surface of said head.

7. A shackle comprising two spaced opposite plates, a pivotal pin extending through said plates and having a head at the outer side of one of the plates, a nut threaded onto said pin at the outer side of the other of said plates, each plate having two recesses surrounding and spaced endwise of said pin and formed at the outer side and inner side respectively of the plate, and two sleeve-members surrounding said pin and arranged and alined endwise between the plates and each provided at its outer end with an external annular flange surrounded by the surrounding wall of the inner recess formed around said pin in the adjacent plate, the aforesaid nut and the aforesaid head being in engagement the one with the outer recess formed around said pin in one plate and the other with the outer recess formed around said pin in the other plate, and the surrounding wall of each of the aforesaid pin-surrounding recesses in each plate being formed by an externally beveled annular flange on said plate.

8. A shackle comprising two spaced plates each of which has each of opposite end portions thereof provided with a pin-receiving hole in line endwise with the pin-receiving hole in the corresponding portion of the other plate, a pivotal pin engaging said holes and having a head which is arranged at the outer side of one of said plates, said pin being held in place in relation to the other of said plates, and two sleeve-members loosely embracing said pin and arranged between and loose in relation to the plates and alined endwise and each provided at its outer end and externally with an externally circular annular flange which is concentric in relation to the pin, the plate adjacent the aforesaid head having an outer flange which surrounds said head and also having an inner flange surrounding the aforesaid flange of the adjacent sleeve-member on said pin, and said flanges of the last-mentioned plate corresponding in internal diameter.

9. A shackle comprising two spaced plates each of which has each of opposite end portions thereof provided with a pin-receiving hole in line endwise with the pin-receiving hole in the corresponding portion of the other plate, a pivotal pin extending through said holes and having a head at the outer side of one of said plates, a nut threaded onto said pin at the outer side of the other of said plates and having an externally circular inner end portion and two sleeve-members loosely embracing said pin and arranged between and loose in relation to the plates and alined endwise and each provided at its outer end and externally with an externally circular annular flange which is concentric in relation to the pin, the plate adjacent the aforesaid nut having an outer annular flange which embraces the aforesaid inner end portion of said nut and also having a flange which surrounds the aforesaid flange of the adjacent sleeve-member on said pin and measures the same in internal diameter as the nut-embracing flange.

10. A shackle comprising two opposite spaced plates each of which has a pin-receiving hole alined endwise with a pin-receiving hole in the other plate, a pivotal pin extending through said holes and having a head at the outer end of one of said holes, a nut threaded onto said pin and arranged at the outer end of the other of said holes, and two sleeve-members surrounding said pin and alined endwise between the plates and each provided at its outer end with an external annular flange, each plate having two spaced annular flanges which surround said pin and are arranged adjacent opposite ends respectively of and concentric in relation to the aforesaid pin-receiving hole in said plate and having an internal diameter measuring more than the diameter of said hole, the inner of the last-mentioned flanges surrounding the flange on the adjacent sleeve-member, the aforesaid nut and the aforesaid head being embraced and surrounded, the one by the outer flange formed around said pin on one of the plates, and the other by the outer flange formed around said pin on the other of said plates, and said outer flanges of the plates and the inner flanges of the plates measuring the same in internal diameter.

11. A shackle comprising two spaced plates each of which has each of opposite end portions thereof provided with a pin-receiving hole in line endwise with the pin-receiving hole in the corresponding portion of the other plate, a pivotal pin extending through said holes and having a head at one end, a nut threaded onto the other end of said pin, and two sleeve-members loosely embracing said pin and arranged between and loose in relation to the plates and alined endwise and each provided at its outer end and externally with an externally circular annular flange which is concentric in relation to the pin, the flanges of the sleeve-members corresponding in external diameter, each plate having an inner flange surrounding the flange of the adjacent sleeve-member on the aforesaid pin and being provided with an outer annular flange which is concentric in relation to said pin and measures the same in internal diameter as said inner flange of the plate, and the aforesaid head and the aforesaid nut being embraced and surrounded the one by the adjacent outer flange of one of said plates and the other by the adjacent outer flange of the other.

12. The combination, with a terminal eye on a leaf-spring, of a shackle adapted to form a connection between said eye and a vehicle-frame or other object and comprising the following:—two spaced plates extending the one opposite one face and the other opposite the other face of said eye, a pivotal pin extending through said eye and through the plates and having a head at one end, a nut threaded onto the other end of said pin, each plate being provided adjacent said pin with two annular flanges surrounding and concentric in relation to said pin and formed at the outer side and inner side respectively of the plate, and two sleeve-members loosely embracing said pin between the plates and alined endwise and each provided at its outer end with an externally circular annular flange which is arranged between the adjacent plate and the adjacent face of the aforesaid eye and surrounded by the adjacent inner flange of said plate, the aforesaid head and the aforesaid nut being embraced and surrounded the one by the adjacent outer flange of one of the plates and the other by the adjacent outer flange of the other plate.

13. The combination, with a terminal eye on a leaf-spring, of a shackle adapted to form a connection between said eye and a vehicle-frame or other object and comprising the following:—two spaced plates extending the one opposite one face and the other opposite the other face of said eye and each having a pin-receiving hole in line endwise with said eye, a pivotal pin extending through said eye and through said hole and having a head which is arranged at the outer end of the pin-receiving hole in one plate and has its inner end portion larger diametrically than said hole and embraced by said plate, a nut threaded onto said pin and arranged at the outer end of the pin-receiving hole in the other plate, and two sleeve-members loosely embracing said pin and alined endwise between the plates and each provided at its outer end and externally with a circular annular flange which is surrounded by the adjacent plate and concentric in relation to said pin and larger in external diameter than and fully and closely covers the adjacent face of the aforesaid eye.

In testimony whereof, I sign the foregoing specification, this 25th day of March, 1922.

BENNO B. LEUSTIG.